(12) United States Patent
Serrano et al.

(10) Patent No.: US 7,351,009 B2
(45) Date of Patent: Apr. 1, 2008

(54) FIBER OPTIC INSTALLATION STRUCTURES IN A PAVED SURFACE, DUCTS, AND METHODS THEREFOR

(75) Inventors: Jorge R. Serrano, Hickory, NC (US); Lothar Finzel, Unterschleissheim (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/724,445

(22) Filed: Nov. 26, 2003

(65) Prior Publication Data

US 2004/0165957 A1    Aug. 26, 2004

Related U.S. Application Data

(63) Continuation-in-part of application No. 10/051,597, filed on Jan. 18, 2002, now Pat. No. 6,866,448, which is a continuation of application No. 09/068,286, filed on May 6, 1998, now Pat. No. 6,371,691.

(51) Int. Cl.
 *F16L 57/00* (2006.01)
 *F16L 1/11* (2006.01)
 *F16L 1/028* (2006.01)

(52) U.S. Cl. ............... 405/157; 405/154.1; 405/184

(58) Field of Classification Search .......... 405/154.1, 405/155, 157, 174–183; 37/365, 378, 347, 37/189, 465, 367, 464; 138/97, 98, 111, 138/115, 116, 117, 177, 178
See application file for complete search history.

(56) References Cited

U.S. PATENT DOCUMENTS

| | | | | |
|---|---|---|---|---|
| 3,648,282 A | * | 3/1972 | Kelly | 340/647 |
| 3,702,062 A | | 11/1972 | Olson | 61/72.6 |
| 3,720,235 A | * | 3/1973 | Schrock | 138/137 |
| 3,722,225 A | | 3/1973 | Empson | 61/72.1 |
| 3,757,529 A | | 9/1973 | Kaercher, Jr. | 61/72.6 |
| 3,952,532 A | | 4/1976 | Spearman | 61/72.4 |
| 4,006,315 A | | 2/1977 | Halstead | 179/82 |
| 4,063,429 A | | 12/1977 | Wilson | 61/105 |
| 4,239,336 A | | 12/1980 | Parfree et al. | 350/96.23 |
| 4,317,000 A | * | 2/1982 | Ferer | 138/137 |

(Continued)

FOREIGN PATENT DOCUMENTS

DE         7606741         9/1976

(Continued)

*Primary Examiner*—Tara L. Mayo
(74) *Attorney, Agent, or Firm*—Michael E. Carroll, Jr.

(57) ABSTRACT

A fiber optic installation structure and method therefor includes a duct having an inner tube, at least one optical waveguide, and a jacket and is disposed within a channel of a paved surface. The jacket generally surrounds the inner tube. When the duct is disposed within a channel defined by a paved surface, a friction fit is created between the duct and the channel for holding the duct in place. Thereafter, a filling material is used for overlying the duct and at least partially filling the channel. In other embodiments, the jacket is capable of being compressed when installed into the channel. The duct may include an armor layer disposed between the inner tube and the jacket for protecting the inner tube. Moreover, at least one optical waveguide may be disposed within at least a portion of the inner tube of the duct and may be introduced after the duct is installed in the paved surface.

22 Claims, 5 Drawing Sheets

U.S. PATENT DOCUMENTS

| | | | |
|---|---|---|---|
| 4,395,834 A | 8/1983 | Davison | 37/98 |
| 4,464,082 A | 8/1984 | Isaacs | 405/157 |
| 4,688,890 A * | 8/1987 | DeMeo et al. | 385/134 |
| 4,785,559 A | 11/1988 | Hentschel | 37/94 |
| 4,812,078 A | 3/1989 | Rivard | 405/179 |
| 4,892,442 A | 1/1990 | Shoffner | 405/154 |
| 4,896,997 A | 1/1990 | Gaylin | 405/156 |
| 5,006,806 A | 4/1991 | Rippingale et al. | 324/326 |
| 5,017,873 A | 5/1991 | Rippingale et al. | 324/326 |
| 5,087,153 A * | 2/1992 | Washburn | 405/183.5 |
| 5,122,750 A | 6/1992 | Rippingale et al. | 324/326 |
| 5,174,686 A * | 12/1992 | Raymond | 405/184 |
| 5,227,080 A * | 7/1993 | Berry | 508/106 |
| 5,238,328 A | 8/1993 | Adams et al. | 405/183.5 |
| 5,308,423 A * | 5/1994 | Kauffman | 156/171 |
| 5,394,904 A * | 3/1995 | Winter et al. | 138/137 |
| 5,467,420 A | 11/1995 | Rohrmann et al. | 385/101 |
| 5,678,609 A * | 10/1997 | Washburn | 138/107 |
| 6,037,546 A * | 3/2000 | Mottine et al. | 174/110 PM |
| 6,147,309 A * | 11/2000 | Mottine et al. | 174/110 PM |
| 6,259,844 B1 * | 7/2001 | Logan et al. | 385/113 |
| 6,311,730 B2 * | 11/2001 | Penza | 138/98 |
| 6,392,152 B1 * | 5/2002 | Mottine et al. | 174/110 PM |
| 2005/0074293 A1 * | 4/2005 | Searby | 405/180 |

FOREIGN PATENT DOCUMENTS

| | | |
|---|---|---|
| DE | 2735079 A1 | 3/1978 |
| DE | 3001226 A1 | 8/1980 |
| DE | 8422532.7 | 1/1985 |
| DE | 3710038 A1 | 10/1988 |
| DE | 4023762 A1 | 1/1992 |
| DE | 4115907 A1 | 11/1992 |
| DE | 4203718 A1 | 8/1993 |
| DE | 19601576 A1 | 7/1997 |
| DE | 19623482 A1 | 12/1997 |
| EP | 0419637 B1 | 11/1994 |
| EP | 0553991 B1 | 12/1996 |
| EP | 875015 B1 | 10/1999 |
| FR | 2677137 | 5/1991 |
| GB | 2003635 A | 7/1978 |
| GB | 1574660 | 9/1980 |
| JP | 57-195206 | 11/1982 |
| JP | 60-014208 | 1/1985 |
| JP | 61-107306 | 5/1986 |
| JP | 03-102231 | 4/1991 |
| JP | 06-109931 | 4/1994 |
| JP | 08-103012 | 4/1996 |
| JP | 08-136780 | 5/1996 |
| WO | 90/10879 | 9/1990 |
| WO | 91/12119 | 8/1991 |
| WO | 92/13227 | 8/1992 |

* cited by examiner

FIBER OPTIC INSTALLATION STRUCTURES IN A PAVED SURFACE, DUCTS, AND METHODS THEREFOR

RELATED APPLICATIONS

The present application is a Continuation-In-Part of U.S. Ser. No. 10/051,597 filed on Jan. 18, 2002, now U.S. Pat. No. 6,866,448, which is a continuation of U.S. application Ser. No. 09/068,286 now U.S. Pat. No. 6,371,691, both of which are incorporated herein by reference.

FIELD OF THE INVENTION

The present invention relates to fiber optic installation structures in a paved surface, and methods therefor along with ducts suitable for installation in paved surfaces.

BACKGROUND OF THE INVENTION

Optical waveguides are used in communication systems for transmitting signals, such as voice, video, and/or data information. As the demand for bandwidth increases optical waveguides will be routed deeper into the communication system network. Consequently, economical means and methods are required for routing optical waveguides, while still providing adequate protection to the fragile optical waveguides. Additionally, installations should be easy to repair and upgrade.

SUMMARY OF THE INVENTION

A fiber optic installation structure including a duct having an inner tube and a jacket. The jacket generally surrounds the inner tube and is formed from a material that is compressible, so that when the duct is disposed within a channel defined by a paved surface a friction fit is created between the duct and the channel. At least one optical waveguide is disposed within at least a portion of the inner tube of the duct and a filling material overlies the duct and at least partially fills the channel.

The present invention is also directed to a duct suitable for being securely held in a channel cut in a paved surface. The duct includes an inner tube and a jacket. The jacket generally surrounds the inner tube and is formed from a material that is compressible so when the duct is placed within the channel the jacket material is capable of being compressed, thereby forming a friction fit between the duct and the channel.

The present invention is further directed to a method for routing a duct within a paved surface. The method includes the steps of forming a channel with a predetermined width in a paved surface and placing a duct into the channel. The duct includes an inner tube and a jacket. When the duct is placed within the channel a friction fit between the duct and the channel is formed over at least a portion of the length.

Additionally, the present invention is directed to a fiber optic installation structure including a duct, a channel, at least one optical waveguide, and a filling material. The duct includes an inner tube and a jacket generally surrounding the inner tube. A channel is defined by a paved surface and the duct is disposed within the channel so that a friction fit is created between at least a portion of the duct and the channel. The at least one optical waveguide is disposed within at least a portion of the inner tube of the duct and a filling material overlies the duct and at least partially filling the channel.

BRIEF DESCRIPTION OF THE FIGS.

DETAILED DESCRIPTION OF THE INVENTION

Figure 1:
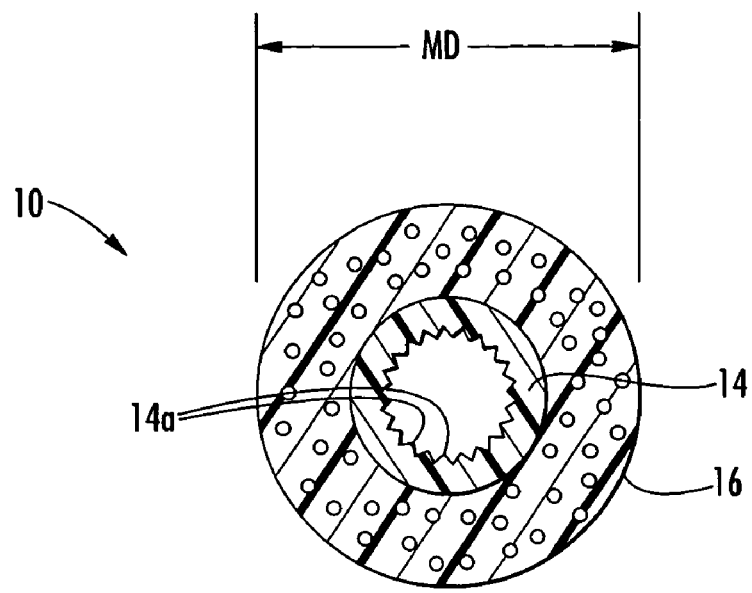
FIG. 1 is a cross-sectional view of a duct according to the present invention.
Figure 2:
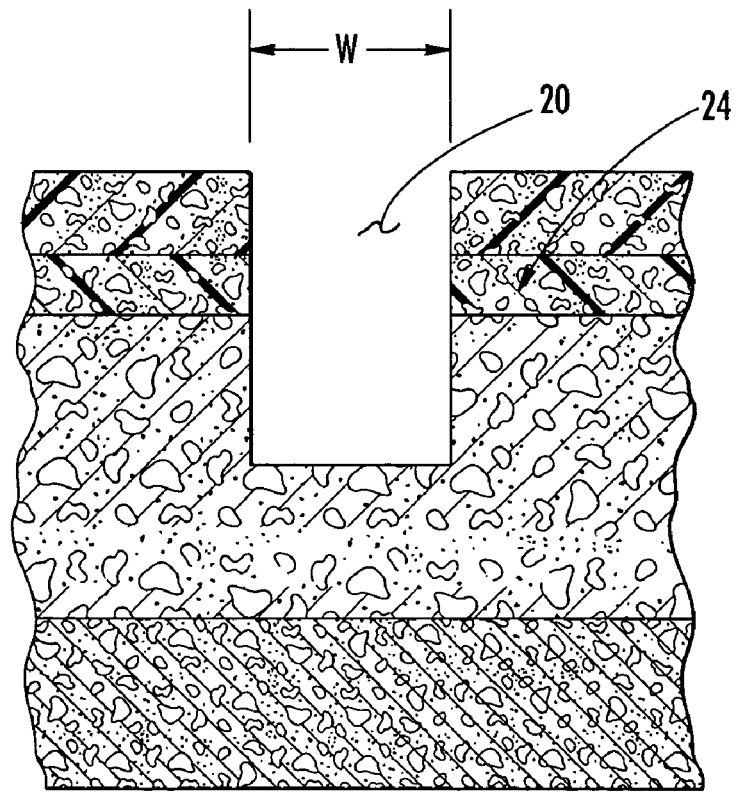
FIG. 2 is a cross-sectional view of a channel formed in a paved surface.
Figure 3:
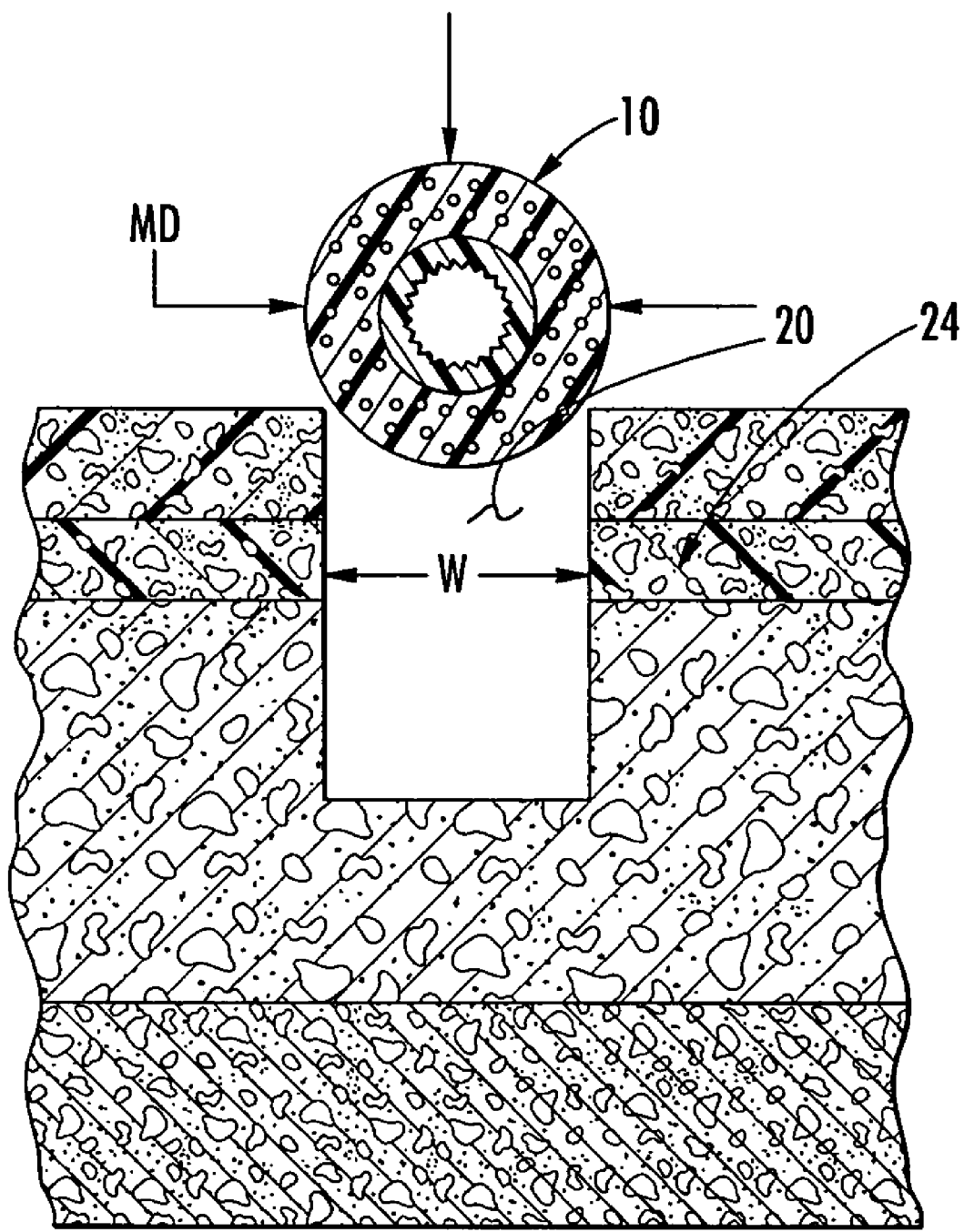
FIG. 3 is a cross-sectional view of the duct of FIG. 1 entering the channel of FIG. 2.
Figure 4:
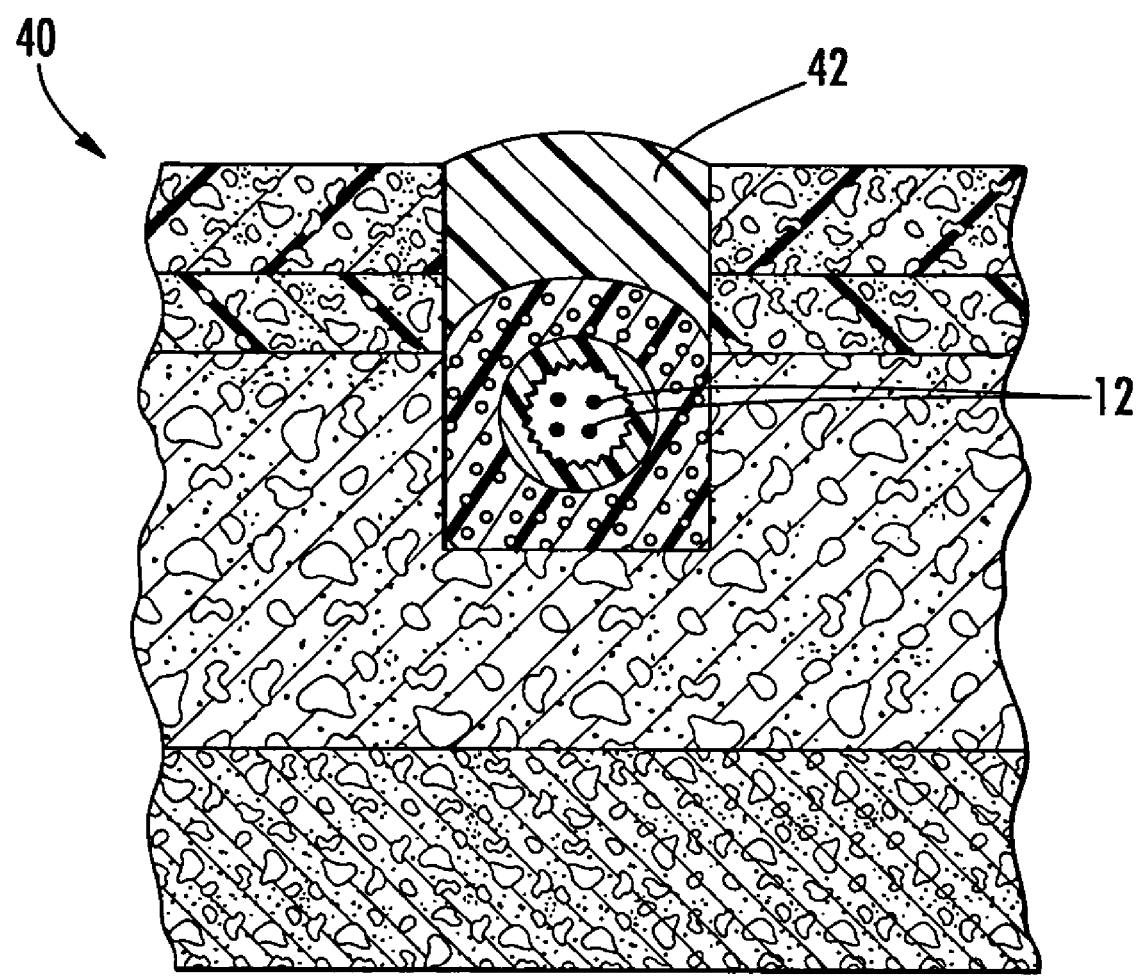
FIG. 4 is a cross-sectional view depicting a fiber optic installation structure with a filling material overlying the duct and optical waveguides disposed within the duct.

The present invention will be described with reference to an explanatory duct 10 that comprises an inner tube 14 and a jacket 16. Duct 10 is suitable for being disposed within a channel 20 defined by a paved surface 24 as depicted in FIG. 2. As used herein, paved surface means asphalt, bitumen, concrete, cement, laid stones, bricks, or tiles, expansion joints, combinations thereof, or other similarly suited solid construction material(s) in which the channel is formed therein. In one embodiment, jacket 16 is formed from a material that is compressible over a portion of its longitudinal length so that it forms a friction fit within channel 20 defined by paved surface 24. In other words, a major dimension MD of jacket 16 is sized so that it is deformed and/or compressed when inserted into channel 20. Thus, major dimension MD of an uncompressed duct 10 is sized so that it is larger than a width W of channel 20 as depicted in FIG. 3. Additionally, channel 20 can have any suitable width W such as about 15 mm; however, width W may be larger. Consequently, when duct 10 is placed, i.e., pressed into channel 20, jacket 16 is compressed/deformed to fit within channel 20, thereby creating a friction fit between duct 10 and channel 20 for holding the duct in channel 20. By way of example, major dimension MD of the outer jacket is compressed by about five percent or more when inserted into the respective channel having width W, thereby creating the friction fit. In still other embodiments, duct 10 can have a friction fit with channel 20 without substantial compression or deformation of duct 10. Thereafter, a suitable filling material 42 is placed over duct 10 for filling at least a portion of channel 20. Moreover, a fiber optic installation structure 40 is formed after at least one optical waveguide 12 or fiber optic cable is routed within a portion of inner tube 14.

Inner tube 14 of duct 10 is formed from a suitable material such as a polymeric material; however, inner tube 14 can be formed from other suitable materials such as metal. In preferred embodiments, inner tube 14 is a polymeric material that includes a plurality of grooves or ridges 14a on its inner surface. Grooves or ridges 14a can be disposed in a variety of configurations such as longitudinal or helical. Generally speaking, grooves or ridges 14a reduce the contact area between optical waveguide 12 (or cable) and inner tube 14, thereby reducing the friction force experienced by optical waveguide 12 when routed within inner tube 14. Thus, all things being equal the force required for routing an optical waveguide within inner tube 14 is generally reduced if it includes grooves or ridges 14a. Additionally, it may also be advantageous to use a material for inner tube 14 that has a low coefficient of friction such as a HDPE or other suitable material.

Jacket 16 of duct 10 is formed from a material that is relatively easy to compress such as by hand so it is relatively easy to insert into channel 20. However, jacket 16 should be rugged enough to inhibit ripping and/or tearing during the installation process. By way of example, suitable materials for the jacket include polymers such as polyethylene, polypropylene, polyvinylchoride (PVC), polyvinylidene fluoride (PVDF), foams, and/or rubbers; however, other suitable materials can be used. Jacket 16 may be foamed, but it not required so as long as it is readily compressible or sized to form a friction fit in channel 20. Foaming is merely one way to make jacket 16 compressible. The foaming of jacket 16 can be created by chemical, mechanical, or other suitable means as known in the art. Using a compressible jacket 16 advantageously allows duct 10 to be easily installable with a friction fit between duct 10 and channel 20 so that duct 10 remains within channel 20 before applying filling material 42. Stated another way, duct 10 is inhibited from moving or "popping out" of channel 20 before filling material 42 is applied, thereby making the installation process easier and/or eliminating other components that may have been used for this purpose. Moreover, if jacket 16 is compressible, then small variations in the width W of channel 20 are easily accommodated.

Ducts and/or fiber optic installations of the present invention may include other suitable components such as an armor layer, water-swellable tapes, detection components for locating the duct, coding components for conveying network information about the installation, and/or optical waveguides 12 within inner tube 14. Furthermore, inner tube 14 and/or jacket 16 can include two or more layers, thereby tailoring the properties of either component. For example, inner tube 14 may have an inner layer made of a low friction material and an outer layer made of a different material. Likewise, jacket 16 may have an outer layer made of an easily compressible material with an inner layer made of a stiffer material for protecting inner tube 14 or vice versa. In other embodiments, a multi-layer jacket may have an outer layer that is heat resistant to inhibit damage by protecting the duct from high temperature conditions and/or materials that may be used to fill the channel.

Figure 5:
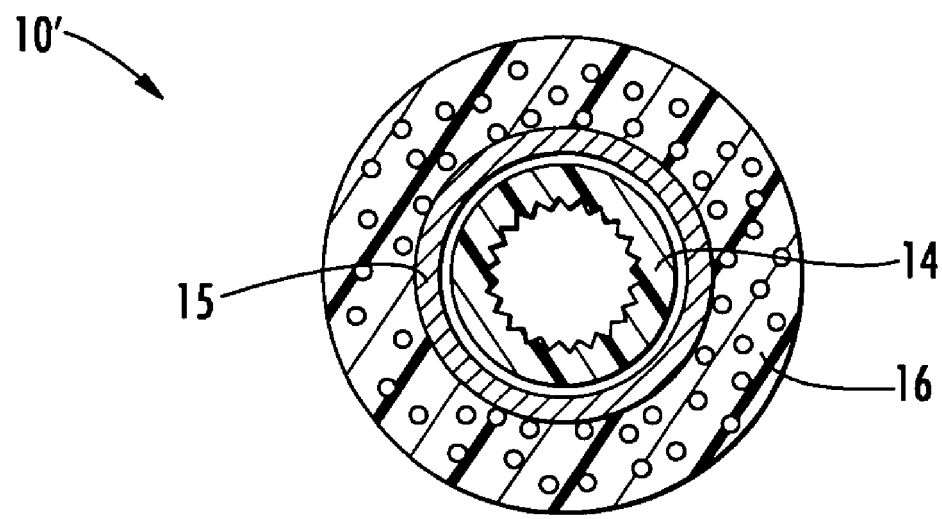
FIG. 5 is a cross-sectional view of a duct having an armor layer according to the present invention.

FIG. 5 depicts duct 10', which is similar to duct 10, but includes an armor layer 15. Specifically, armor layer 15 is generally disposed between inner tube 14 and jacket 16 of duct 10'. Armor layer 15 may be formed from a metal, a dielectric, a composite material, or other suitable types of material for protecting inner tube 14. In one embodiment, armor layer 15 is an interlocking helically wrapped metal armor such as a BX armor. However, other suitable armor layers include a longitudinally roll-formed armor, corrugated armor, and/or bend-limiting armor. In addition to providing crush resistance, a metallic armor may be grounded or carry a current. On the other hand, dielectric configurations are possible by using, for instance, a polymer armor layer.

Figure 6:
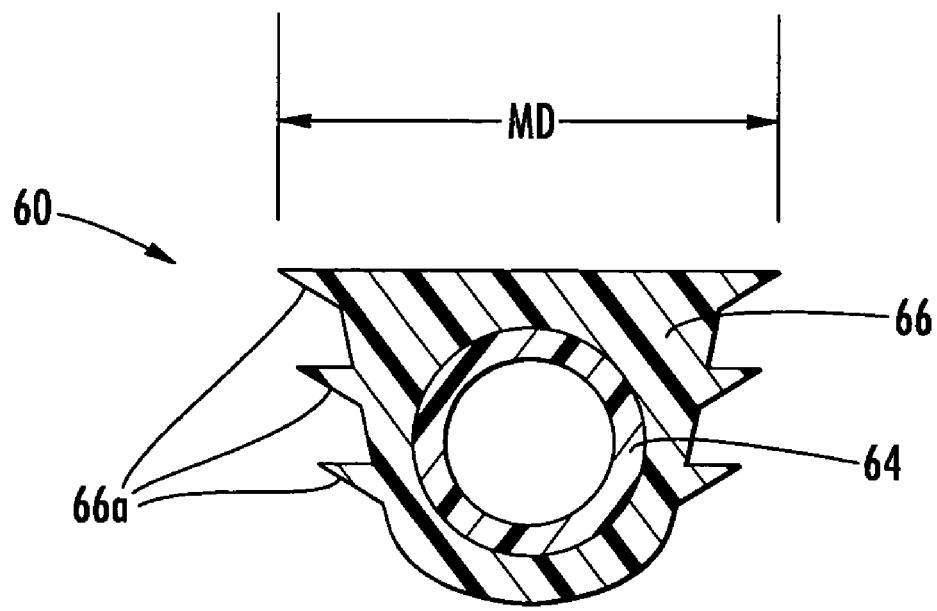
FIG. 6 is a cross-sectional view of another duct according to the present invention.

Embodiments of the present invention can also have other cross-sectional shapes besides round. For example, FIG. 6 illustrates duct 60 that includes a jacket 66 having a generally wedge-shaped cross-section. Additionally, jacket 66 includes a plurality of barbs 66a that aid in creating a friction fit between duct 60 and a channel when insert therein. In this case, the major dimension MD of duct 60 is disposed across the uppermost set of barbs 66a. Other embodiments can exclude barbs 66a and merely use a wedge shaped cross-section. Likewise, other suitable cross-sectional shapes are possible and within the scope of the present invention.

Figure 7:
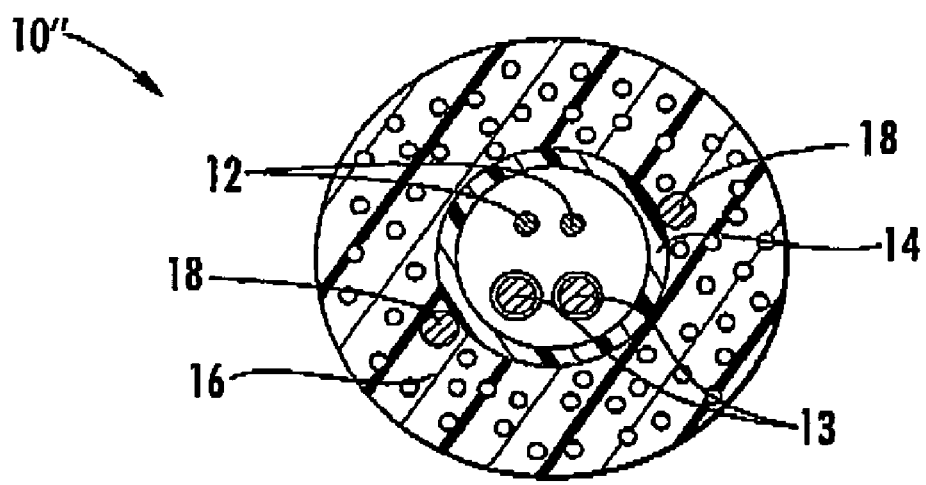
FIG. 7 is a cross-sectional view of yet another duct according to the present invention.

Other configurations according to the concepts of the present invention are also possible. For instance, FIG. 7 illustrates a duct 10", which is similar to duct 10. Duct 10" includes an inner tube 14, at least one wire 18, and a jacket 16. In this embodiment, two wires 18 are wrapped about inner tube 14 and provide crush and kink resistance to duct 10". Wires 18 can be any suitable material(s) such as conductors such as copper, or copper cladded steel or non-conductors such as high-density polyethylene, composite materials, or other suitable materials. In one embodiment, wires 18 can be copper wires suitable for carrying electric power along the duct. The copper wires can be bare or include an insulation layer. Additionally, duct 10" may include an armor layer with the at least one wire being disposed radially inward or radially outward of the armor layer. In other embodiments, the at least one wire can form a portion of a wire mesh about the inner tube. Moreover, other embodiments of the present invention can employ other types of materials about inner tube 14 for improving crush and kink resistance.

Figure 8:
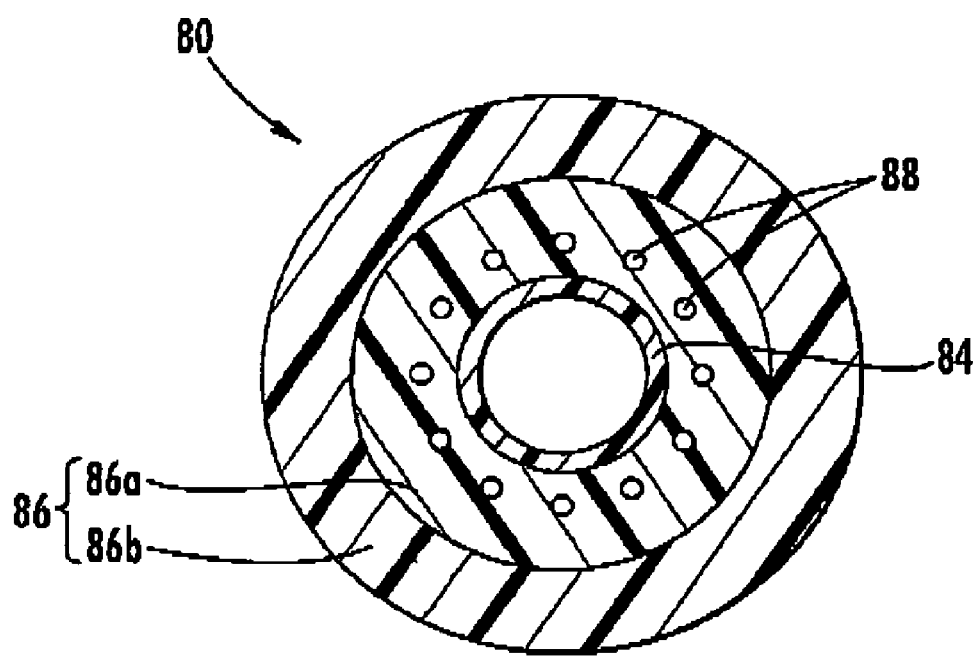
FIG. 8 is a cross-sectional view of still another duct according to the present invention.

For instance, FIG. 8 depicts a duct 80 according to the concepts of the present invention. Duct 80 includes an inner tube 84, a jacket 86, and a plastic mesh 88 disposed within jacket 86. In this case, jacket 86 includes multiple layers 86a and 86b. Layer 86a includes a first material having a plastic mesh disposed therein, thereby providing crush and kink resistance to the duct. Layer 86b is formed from a second material that provides heat-resistance. Moreover, the first material of layer 86a has a first set of predetermined material characteristics and the second material of layer 86b has a second set of predetermined material characteristics. For instance, material characteristics include hardness, foamed, heat-resistance, chemical resistance, or compressibility. In this case, the first material has at least one predetermined material characteristic that is different from the respective predetermined material characteristic of the second material. Additionally, the first and second materials may have many different predetermined material characteristics, thereby tailoring the duct for the desired performance characteristics.

In view of the present disclosure, many modifications and other embodiments of the present invention, within the scope of the appended claims, will become apparent to a skilled artisan. For example, embodiments of the present invention may have one or more electrical conductors 13 disposed within the inner tube (FIG. 7), the jacket of the duct, or within the channel. Therefore, it is to be understood that the present inventions are not to be limited to the specific embodiments disclosed herein and that modifications and other embodiments are intended to be included within the scope of the appended claims. Although specific terms are employed herein, they are used in a generic and descriptive sense only and not for purposes of limitation. The invention has been illustrated with reference to a loose optical waveguides, but the inventive concepts of the present invention are applicable to any suitable configuration of optical waveguides such as ribbons, bundles, and/or buffered optical waveguides.

That which is claimed:

1. A fiber optic installation structure comprising:
   a duct, comprising an inner tube and a jacket, the jacket generally surrounding the inner tube, wherein the jacket is formed from a material that is compressible, so that when the duct is disposed within a channel defined by a paved surface a friction fit is created between the duct and the channel over a portion of a duct length;

at least one optical waveguide disposed within at least a portion of the inner tube of the duct; and a filling material overlying the duct and at least partially filling the channel.

2. The fiber optic installation structure of claim 1, the jacket being a foamed material adapted for being compressed by when inserted into the channel, wherein a major dimension of the jacket is compressed by about five percent or more when inserted into the channel.

3. The fiber optic installation structure of claim 1, the duct further comprising an armor layer, the armor layer being generally disposed between the inner tube and the jacket.

4. The fiber optic installation structure of claim 3, the armor layer being formed from a helically wrapped interlocking armor tape.

5. The fiber optic installation structure of claim 3, the armor layer being formed from a longitudinally wrapped armor tape.

6. The fiber optic installation structure of claim 1, the inner tube having ribs on a portion of the inner surface for aiding in routing optical fibers within the inner tube.

7. The fiber optic installation structure of claim 1, the duct having a non-round cross-section.

8. The fiber optic installation structure of claim 1, the duct having a non-round cross-section and an armor layer, the armor layer being generally disposed between the inner tube and the jacket.

9. The fiber optic installation structure of claim 1, the jacket being formed from a heat resistant material.

10. The fiber optic installation structure of claim 1, the jacket being a material that is compressed by about five percent or more along a major dimension of the jacket when inserted into the channel and an armor layer generally disposed between the inner tube and the jacket.

11. The fiber optic installation structure of claim 1, the inner tube having ribs on a portion of the inner surface for aiding in routing optical fibers within the inner tube and an armor layer generally disposed between the inner tube and the jacket.

12. The fiber optic installation structure of claim 1, the duct further comprising at least one wire wrapped about the inner tube with the at least one wire being selected from the group of a conductive material, a non-conductive material, and a composite material.

13. The fiber optic installation structure of claim 1, further comprising at least one electrical conductor.

14. The fiber optic installation structure of claim 1, the jacket being formed from at least two layers.

15. A fiber optic installation structure comprising:

a duct, comprising an inner tube and a jacket, the jacket generally surrounding the inner tube;

a channel defined by a paved surface, the duct being disposed within the channel so that a friction fit is created between the duct and the channel over a portion of a duct length;

at least one optical waveguide disposed within at least a portion of the inner tube of the duct; and a filling material overlying the duct and at least partially filling the channel.

16. The fiber optic installation structure of claim 15, the duct further comprising an armor layer, the armor layer being generally disposed between the inner tube and the jacket.

17. The fiber optic installation structure of claim 15, the inner tube having ribs on a portion of the inner surface for aiding in routing optical fibers within the inner tube.

18. The fiber optic installation structure of claim 15, the jacket being formed from a heat resistant material.

19. The fiber optic installation structure of claim 15, the inner tube having ribs on a portion of the inner surface for aiding in routing optical fibers within the inner tube and an armor layer generally disposed between the inner tube and the jacket.

20. The fiber optic installation structure of claim 15, the duct further comprising at least one wire wrapped about the inner tube with the at least one wire being selected from the group consisting of a conductive material, a non-conductive material, and a composite material.

21. The fiber optic installation structure of claim 15, further comprising at least one electrical conductor.

22. The fiber optic installation structure of claim 15, the jacket being formed from at least two layers.

* * * * *